(12) United States Patent
Dlugoss et al.

(10) Patent No.: US 8,185,285 B2
(45) Date of Patent: May 22, 2012

(54) TRANSMISSION HYDRAULIC PRESSURE SENSOR BASED ALTITUDE MEASUREMENT

(75) Inventors: Randall B. Dlugoss, Royal Oak, MI (US); Bret M. Olson, Canton, MI (US)

(73) Assignee: GM Global Technology Operations LLC

( * ) Notice: Subject to any disclaimer, the term of this patent is extended or adjusted under 35 U.S.C. 154(b) by 1025 days.

(21) Appl. No.: 12/119,674

(22) Filed: May 13, 2008

(65) Prior Publication Data
US 2009/0254257 A1    Oct. 8, 2009

Related U.S. Application Data

(60) Provisional application No. 61/043,209, filed on Apr. 8, 2008.

(51) Int. Cl.
*G06F 19/00*    (2006.01)

(52) U.S. Cl. .......................................................... 701/65
(58) Field of Classification Search ................. 701/65
See application file for complete search history.

(56) References Cited

U.S. PATENT DOCUMENTS

| | | | | |
|---|---|---|---|---|
| 4,943,921 | A | * | 7/1990 | Baltusis et al. ................. 701/55 |
| 5,069,083 | A | | 12/1991 | Hirano |
| 5,157,991 | A | * | 10/1992 | Sumimoto ..................... 477/98 |
| 6,246,951 | B1 | | 6/2001 | Robichaux |
| 7,553,257 | B2 | * | 6/2009 | Shigeta et al. .................. 477/98 |

\* cited by examiner

*Primary Examiner* — Eric Culbreth

(57) ABSTRACT

A control system of a vehicle includes a pressure sensor that generates a pressure signal based on a pressure in a transmission of the vehicle. A control module determines atmospheric pressure based on the pressure signal. The control module controls operation of at least one of the transmission and an engine of the vehicle by generating a control signal based on the atmospheric pressure.

20 Claims, 6 Drawing Sheets

TRANSMISSION HYDRAULIC PRESSURE SENSOR BASED ALTITUDE MEASUREMENT

CROSS-REFERENCE TO RELATED APPLICATIONS

This application claims the benefit of U.S. Provisional Application No. 61/043,209, filed on Apr. 8, 2008. The disclosure of the above application is incorporated herein by reference.

FIELD OF THE INVENTION

The present invention relates to vehicle altitude sensors and corresponding control systems.

BACKGROUND OF THE INVENTION

The statements in this section merely provide background information related to the present disclosure and may not constitute prior art.

As altitude of a vehicle increases, air pressure experienced by the vehicle decreases, which affects the engine performance of the vehicle. Engine operating parameters, such as air intake and fuel supply, may be modified based on the altitude to improve engine performance.

A vehicle may include an altitude or barometric pressure sensor to detect a current altitude. Over time the altitude sensor and/or corresponding circuitry may degrade and provide an inaccurate indication of altitude. This can negatively affect engine operation and can also negatively affect operation of an automatic transmission An automatic transmission of the vehicle may operate based on information received from the engine and/or an engine control system. For example, the transmission may determine an appropriate gear ratio and/or a rate of transitioning between gear ratios based on an estimated power output signal from the engine control system. When an inaccurate altitude signal is generated, the estimated power output signal may also be inaccurate, resulting in improper transmission operation.

The inclusion of an altitude sensor on a vehicle also increases vehicle hardware, which increases vehicle costs.

SUMMARY OF THE INVENTION

In one embodiment, a control system of a vehicle is provided and includes a pressure sensor that detects hydraulic fluid pressure and that generates a pressure signal based on a pressure in a transmission of the vehicle. A control module determines atmospheric pressure based on the pressure signal. The control module controls operation of at least one of the transmission and an engine of the vehicle by generating a control signal based on the atmospheric pressure.

In another embodiment, a control system of a vehicle is provided and includes an elevation estimation module that receives pressure signals from a transmission via a pressure sensor that detects hydraulic fluid pressure and that generates an estimated elevation signal. A control module generates a control signal based on the estimated elevation signal and a sensor signal received from a non-transmission elevation sensor.

In a further embodiment, a method of operating a control system of a vehicle includes generating a pressure signal based on a pressure in a transmission of the vehicle via a pressure sensor that detects hydraulic fluid pressure. Atmospheric pressure is determined based on the pressure signal. A sensor signal is generated from a non-transmission elevation sensor. Elevation of the vehicle is determined based on the atmospheric pressure and said sensor signal. A control signal is generated to adjust operation of at least one of the transmission and an engine of the vehicle based on the elevation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
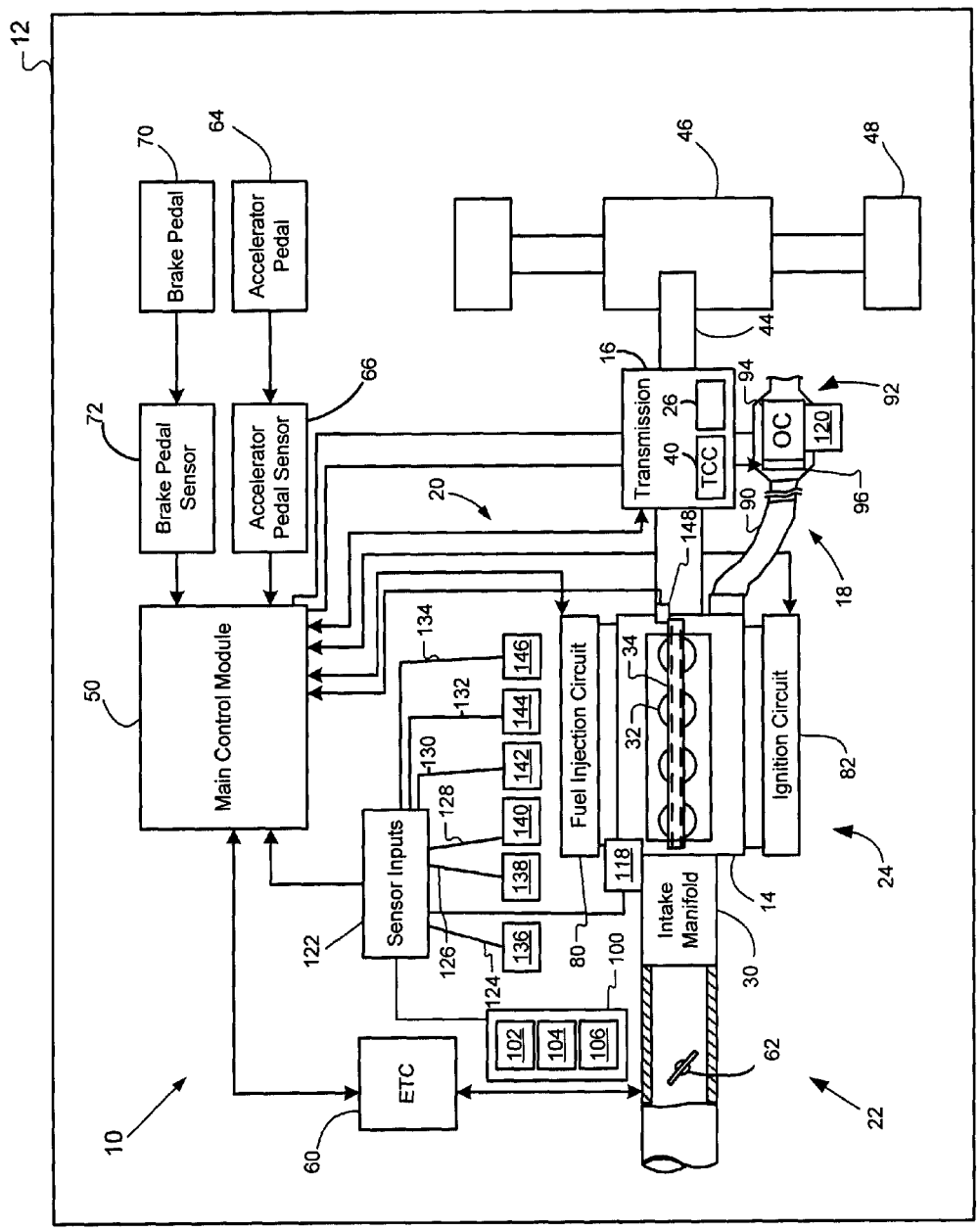
FIG. 1 is a functional block diagram of a vehicle control system incorporating transmission pressure sensors in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In addition, although the following embodiments are described primarily with respect to an internal combustion engine, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

Also, in the following description the term "non-transmission elevation sensor" refers to a sensor that provides an indication of vehicle elevation and is located external to a transmission. The indication may be a direct or indirect measure of vehicle elevation. For example, a non-transmission elevation sensor may include an altitude pressure sensor, which may provide a direct indication of vehicle elevation. As another example, a non-transmission elevation sensor may include, as a couple of examples, a barometric pressure sensor or a mass air flow (MAF) sensor that indirectly indicates elevation based on air pressure. The barometric pressure sensor indicates atmospheric pressure and the MAF sensor indicates air pressure entering an intake of an engine. The measure of air flow into an engine may be used to indirectly measure atmospheric pressure and thus vehicle elevation. A non-transmission elevation sensor may include a manifold absolute pressure (MAP) sensor, an airflow sensor, a barometric pressure sensor, etc.

Referring now to FIG. 1, a vehicle control system 10 is shown. The vehicle control system 10 is on a vehicle 12 and includes and controls operation of an engine 14, a transmission 16 and an exhaust system 18. The engine 14 may include a fuel injection system 20, an air intake (injection) system 22, and an ignition system 24. The transmission 16 includes one or more pressure sensors 26, which are used to control operation of the engine 14 and the transmission 16. The pressure sensors 26 are sensitive to barometric pressure and altitude. The pressure sensors 26 are used to indicate pressures within the transmission 16 for gear ratio selection, gear ratio transitioning, etc. The pressure sensors 26 are also use to indicate elevation, which may include altitude, of the vehicle 12 during certain operating conditions.

The engine 14 includes an intake manifold 30 and combusts an air and fuel mixture to produce drive torque. The engine 14, as shown, includes four cylinders 32 in an in-line configuration. Although FIG. 1 depicts four cylinders (N=4), it can be appreciated that the engine 14 may include additional or fewer cylinders. Each of the cylinders 32 may have one or more corresponding intake valves, exhaust valves, and pistons that ride on a crankshaft 34.

An output of the engine 14 is coupled by a torque converter 40, the transmission 16, a driveshaft 44 and a differential 46 to driven wheels 48. The transmission 16 may, for example, be a continuously variable transmission (CVT) or a step-gear automatic transmission. The transmission 16 is controlled by a main control module 50.

Air is drawn into the intake manifold 30 via the electronic throttle controller (ETC) 60, or a cable-driven throttle, which adjusts a throttle plate 62 that is located adjacent to an inlet of an intake manifold 30. The adjustment may be based upon a position of an accelerator pedal 64 and a throttle control algorithm that is executed by the control module 50. The throttle 62 adjusts airflow and intake manifold pressure that affects output torque that drives the wheels 48. An accelerator pedal sensor 66 generates a pedal position signal that is output to the control module 50 based on a position of the accelerator pedal 64. A position of a brake pedal 70 is sensed by a brake pedal sensor or switch 72, which generates a brake pedal position signal that is output to the control module 50.

Air is drawn into the cylinders 32 from the intake manifold 30 and is compressed therein. Fuel is injected into cylinders 32 by a fuel injection circuit 80 and the spark generated by the ignition system 24 ignites the air/fuel mixtures in the cylinders 32. Exhaust gases are exhausted from the cylinders 32 into the exhaust system 18. In some instances, the engine system 50 can include a turbocharger that uses an exhaust driven turbine to drive a compressor that compresses the air entering the intake manifold 30. The compressed air may pass through an air cooler before entering into the intake manifold 30.

The fuel injection system includes a fuel injection circuit 80, which may include fuel injectors that are associated with each of the cylinders 32. A fuel rail provides fuel to each of the fuel injectors after reception from, for example, a fuel pump or reservoir. The control module 50 controls operation of the fuel injectors including the number and timing of fuel injections into each of the cylinders 32 and per combustion cycle thereof. The fuel injection timing may be relative to crankshaft positioning.

The ignition system 24 includes an ignition circuit 82, which may include spark plugs or other ignition devices for ignition of the air/fuel mixtures in each of the cylinders 32. The ignition system 24 also may include the control module 50. The control module 50 may, for example, control spark timing relative to crankshaft positioning.

The exhaust system 18 may include exhaust manifolds and/or exhaust conduits, such as conduit 90 and a filter system 92. The exhaust manifolds and conduits direct the exhaust exiting the cylinders 32 into filter system 92. Optionally, an EGR valve re-circulates a portion of the exhaust back into the intake manifold 32. A portion of the exhaust may be directed into a turbocharger to drive a turbine. The turbine facilitates the compression of the fresh air received from the intake manifold 32. A combined exhaust stream flows from the turbocharger through the filter system 92.

The filter system 92 may include a catalytic converter or an oxidation catalyst (OC) 94 and a heating element 96, as well as a particulate filter, a liquid reductant system and/or other exhaust filtration system devices. The heating element 96 may be used to heat the oxidation catalyst 94 during startup of the engine 14 and be controlled by the control module 50. The liquid reductant may include urea, ammonia, or some other liquid reductant. Liquid reductant is injected into the exhaust stream to react with NOx to generate water vapor ($H_2O$) and $N_2$ (nitrogen gas).

The vehicle control system 10 may include non-transmission elevation sensors 100, as well as other sensors. The non-transmission elevation sensors 100 may include, for example, a barometric sensor 102, a MAF sensor 104 and a MAP sensor 106. Other non-transmission elevation sensors, such as altitude sensors, may be incorporated. In one embodiment, elevation sensors that directly measure elevation, such as altitude sensors, are not incorporated. For example only, elevation may be determined and/or estimated based on signals from the pressure sensors 26. Elevation may also be estimated based on signals from non-transmission elevation sensors that provide indirect indications of elevation. For example only, elevation may be indirectly determined by the MAF sensor 104 or the MAP sensor 106.

The vehicle control system 10 may include an engine temperature sensor 118 and an exhaust temperature sensor 120. The engine temperature sensor 118 may detect oil or coolant temperature of the engine 14 or some other engine temperature. The exhaust temperature sensor 120 may detect temperature of the oxidation catalyst 94 or some other component of the exhaust system 58.

Other sensor inputs collectively indicated by reference number 122 and may be used by the main control module 50 and include an engine speed signal 124, a vehicle speed signal 126, a power supply signal 128, oil pressure signal 130, an engine temperature signal 132, and a cylinder identification signal 134. The sensor input signals 124-134 are respectively generated by engine speed sensor 136, vehicle speed sensor 138, a power supply sensor 140, an oil pressure sensor 142, an engine temperature sensor 144, and cylinder identification sensor 146. Some other sensor inputs may include an intake manifold pressure signal, a throttle position signal, a transmission signal, and manifold air temperature signal.

The vehicle control system 10 may also include one or more timing sensors 148. Although the timing sensor 148 is shown as a crankshaft position sensor, the timing sensor 148 may be a camshaft position sensor, a transmission sensor, or some other timing sensor. The timing sensor 148 generates a timing signal that is indicative of position of one or more pistons and/or a crankshaft and/or a camshaft.

The main control module 50 operates the engine 14 and the transmission 16 based on elevation estimates. The elevation estimates may be generated based on signals from each of the pressure sensors 26 and the non-transmission elevation sensors 100. The transmission 16 is controlled based on determined output power of the engine 14 and the elevation estimates. The determined output power may be based on the elevation estimates.

Figure 2:
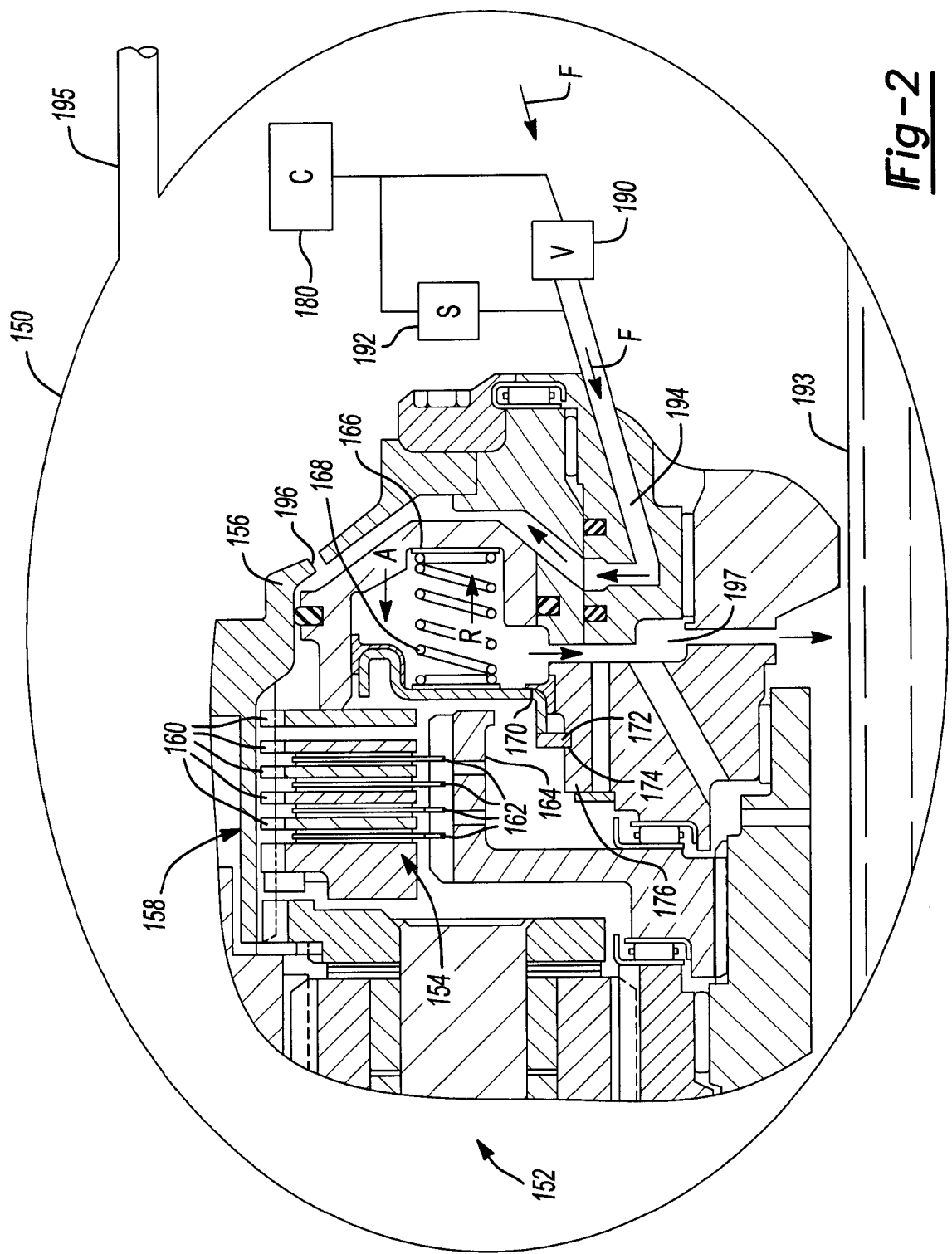
FIG. 2 is a functional block diagram and sectional view of a portion of a transmission in accordance with an embodiment of the present disclosure.

Referring now to FIG. 2, a functional block diagram and sectional view of a portion of a transmission 150 is shown. The transmission 150 includes a clutch assembly 152 operable for transferring torque with a clutch pack 154 that is disposed within a clutch housing 156. The clutch housing 156 is splined at 158 to receive the clutch pack 154, although a separate member, such as a clutch drum or another clutch member, may be used in place of the clutch pack 154. The clutch pack 154 has clutch plates 160 and friction plates 162. Additional clutch assemblies may be incorporated.

The clutch plates 160 are interposed between the friction plates 162, which are splined to a clutch hub 164. The clutch plates 160 and the friction plates 162 may be selectively engaged by an apply piston 166. The clutch assembly 152 further includes a return spring 168 disposed between the apply piston 166 and a balance piston 170. The return spring 168 applies a return force to the apply piston 166 in the direction of arrow R. An external retaining ring 172, which may also be adapted for retaining the balance piston 170, is disposed within a retainer groove 174 that is defined by the clutch housing 156.

The clutch assembly 152 is in communication with and controlled by a control module 180, which is configured to include a transmission control algorithm. The control module 180 includes a pressure control algorithm. The pressure control algorithm may be configured as a portion of the transmission control algorithm. The transmission control algorithm controls shift states and phases, commanded pressure profiles, sensors and associated signal conditioning, etc. Progression through the pressure control algorithm may be modified, changed, and/or aborted based on the transmission control algorithm and transmission inputs, such as turbine speed, pressure sensor inputs, etc.

The pressure control algorithm may be used to control pressure-related events. Atmospheric conditions may be checked and verified by pressure sensor inputs from pressure sensors, such as from a pressure sensor 192. The pressure sensor may measure pressures approximately between −5000 to 5000 psi±1%. Examples of additional inputs to the pressure control algorithm include turbine speed and output speed, which are monitored to properly diagnose the state of the transmission.

The control module 180 is in direct or indirect/wireless communication with a pressure control solenoid 190 and one or more pressure sensors (a single pressure sensor 192 is shown). The sensor 192 may be located downstream of the pressure control solenoid 190. The sensor 192 may be located in the clutch assembly 152 or in a valve body assembly (valve body not detailed in FIG. 2).

The pressure control solenoid 190 is configured for selectively admitting or preventing a flow of pressurized fluid F, from a pump. The pressure control solenoid 190 can be configured to selectively allow fluid exhaust and therefore atmospheric pressure into the clutch control assembly 152 and/or to the pressure sensor 192.

Each shift from one speed ratio to another includes pressurizing passage way 194 to fill an on-coming clutch with pressurized fluid in preparation for torque transmission. The pressurized fluid compresses the internal return spring 168, thereby stroking the apply piston 166. Once sufficiently filled, the apply piston 166 applies a clutch apply force to the clutch plates 160 and friction plates 162 in the direction of arrow A. This develops a torque capacity exceeding the return force (arrow R) of the return spring 168. Thereafter, the clutch assembly 152 may transmit torque in relation to a clutch apply pressure.

During pressurization of the passageway 194, atmospheric pressure is not measured by the pressure sensor 192. Hydraulic fluid may be exhausted at a low flow rate through an orifice or exhaust control port denoted as CE. This allows trapped air to exhaust, thereby depressurizing to atmospheric pressure during moments of clutch de-stroking.

During non-pressurized events, the fluid in passageway 194 is exhausted to transmission sump 193 by way of a self-exhausting mechanism. The exhausting mechanism may be passive and/or active and include a solenoid, a valve with a check ball (when unseated pressure is released), etc. In the example shown in FIG. 2, the exhausting mechanism is passive and includes an orifice 196 that allows for fluid exhaust of passageway 194. The opening of the orifice may be controlled via a valve. The orifice may be fluidically coupled to a fluid overflow port 195. The fluid that is exhausted via the exhausting mechanism may be provided to the fluid overflow port 195. Because of a fluid overflow port 195 the pressure inside of the transmission is equal to the pressure of the atmosphere. Therefore the pressure in the passageway 194 is equal to the atmosphere pressure.

The exhausting of fluid allows the applied pressure on the clutch due to transmission operation to decrease to a non-pressurized state. This may be referred to as an exhausted state. Atmospheric pressures may be detected when a pressure sensor indicates that an exhausted state is present and atmospheric pressure is present. At this point the clutch is fully disengaged. The pressure sensors disclosed herein may be calibrated to generate a pressure of zero when clutch applied hydraulic fluid pressure is zero (exhausted) and elevation of the corresponding vehicle is at sea level.

The pressure control solenoid 190 may be a two-way control valve and be used in combination with or in replacement of the exhausting mechanism and/or orifice 196. The pressure control solenoid 190 may, in addition to controlling the flow of fluid into passageway 194, allow for the release of fluid from passageway 194 into the sump 193.

A back-pressure exhaust port 197 may also be included. The exhaust port 197 allows fluid to flow to sump 193 and thus neutralize pressures near the piston 170. The exhaust port may be open or fluidically coupled to the overflow port 195.

Figure 3:
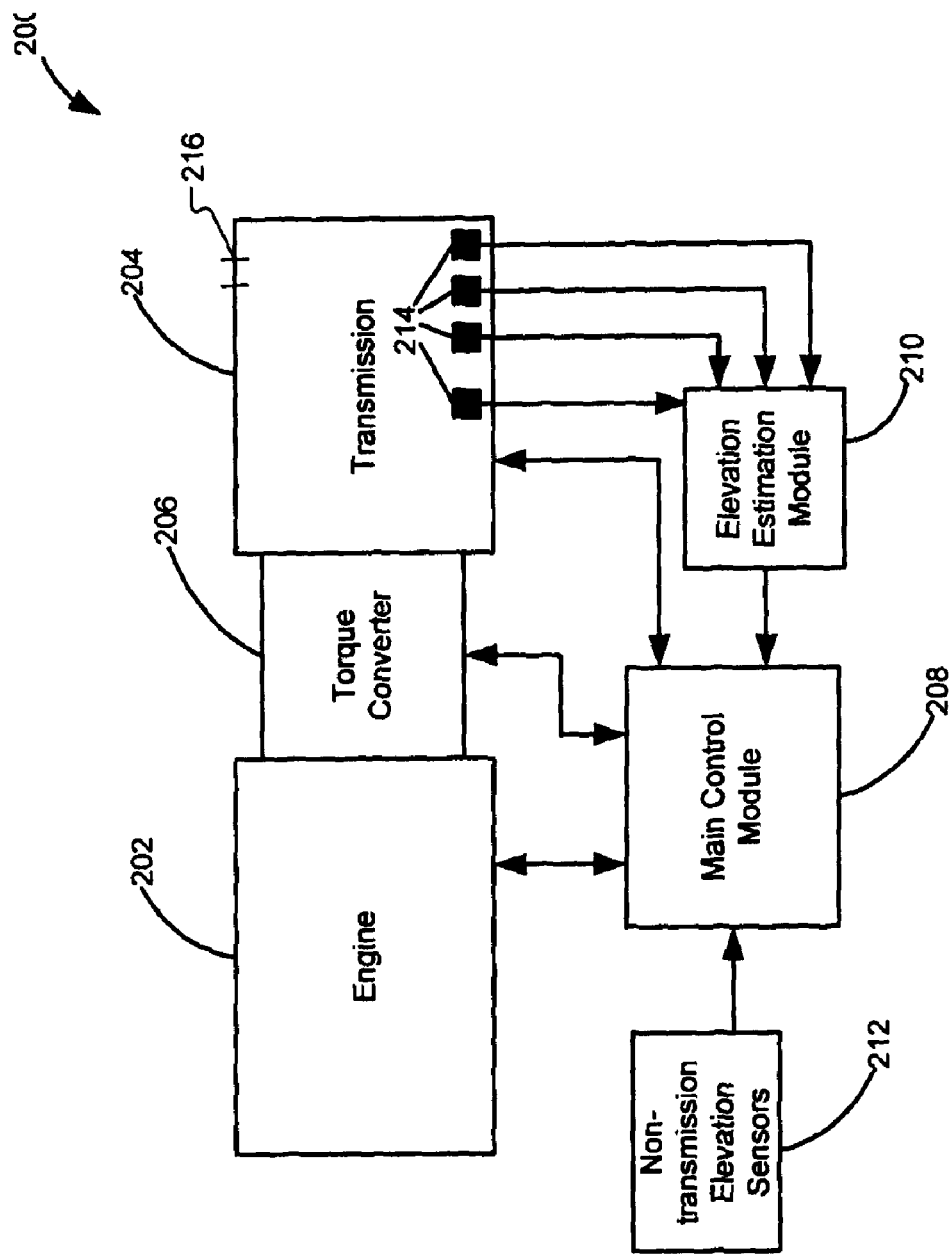
FIG. 3 is a functional block diagram of a vehicle control system illustrating use of transmission pressure sensors for elevation estimation in accordance with an embodiment of the present disclosure.

Referring now to FIG. 3, an exemplary vehicle control system 200 is shown. An engine 202 is coupled to a transmission 204 by a torque converter 206. A main control module 208 communicates with the engine 202, the transmission 204 and the torque converter 206. The main control module 208 receives an estimated elevation signal from an elevation estimation module 210. The main control module 208 may include the elevation estimation module. The main control module 208 also receives signals from the non-transmission elevation sensors 212. The non-transmission elevation sensors 212 provide signals that indicate vehicle elevation.

The elevation estimation module 210 receives transmission pressure signals from transmission pressure sensors 214. The transmission pressure signals may be based on hydraulic and/or atmospheric pressures within the transmission 204. The transmission 204 is open to atmospheric pressure via one or more holes or non-sealed elements, such as the inlet 216, of the transmission 204.

The elevation estimation module 210 generates the estimated elevation signal based on the pressure signals. The elevation estimation module 210 may generate the estimated elevation signal when the pressure signals are and/or an average of the pressure signals is below one or more predetermined threshold levels. During operation hydraulic pressures in the transmission can be higher than atmospheric pressure and affect the estimate of elevation. The elevation estimation module 210 estimates elevation during certain operating conditions or when pressure on one or more of the pressure sensors 214 is less than a predetermined threshold.

During operation, one or more of hydraulic clutches of the transmission 204 may be in an OFF state. When in an OFF state hydraulic pressure associated with that clutch is low. When the hydraulic pressure is low, the corresponding pressure sensor is able to detect atmospheric pressure or an approximation thereof. Each of the pressure sensors 214 may correspond to one or more hydraulic clutches of the transmission 204.

Each of the pressure sensors 214 thus operate in dual modes. In a first mode, the pressure sensors 214 may be used to detect hydraulic pressure applied to a hydraulic clutch. In a second mode, the pressure sensors 214 may be used to detect atmospheric pressure. The pressure sensors 214 may all operate in the same mode during the same time period or may operate in different modes during the same time period.

Pressure sensor signals may be measured when the corresponding vehicle is not accelerating or decelerating. During this operating condition, a predetermined pressure may be expected. When the actual pressure detected by a pressure sensor is higher than the expected pressure or is outside of a predetermined range, the vehicle may be at a low elevation level. When the actual pressure detected by a pressure signal is lower than the expected pressure or is outside of a predetermined range, the vehicle may be at a high elevation level. This may be performed at a particular engine speed that is predetermined. The actual pressure detected may be applied to a model to extrapolate atmospheric pressure.

The pressure signals may be used for cross-check, diagnostic check, performance check, etc. During a cross-check, the pressure signal from one pressure sensor may be compared with a pressure signal from other pressure sensors. In another embodiment, during a cross-check, an elevation estimate generated based on a signal from one pressure sensor is compared with elevation estimates from other pressure sensors and/or from non-transmission elevation sensors.

The pressure sensors 214 and the non-transmission elevation sensors 212 provide redundancy in case of a sensor failure. The pressure sensors 214 may backup each other and/or the non-transmission elevation sensors 212. The non-transmission elevation sensors 212 may backup each other and/or the pressure sensors 214.

Figure 4:
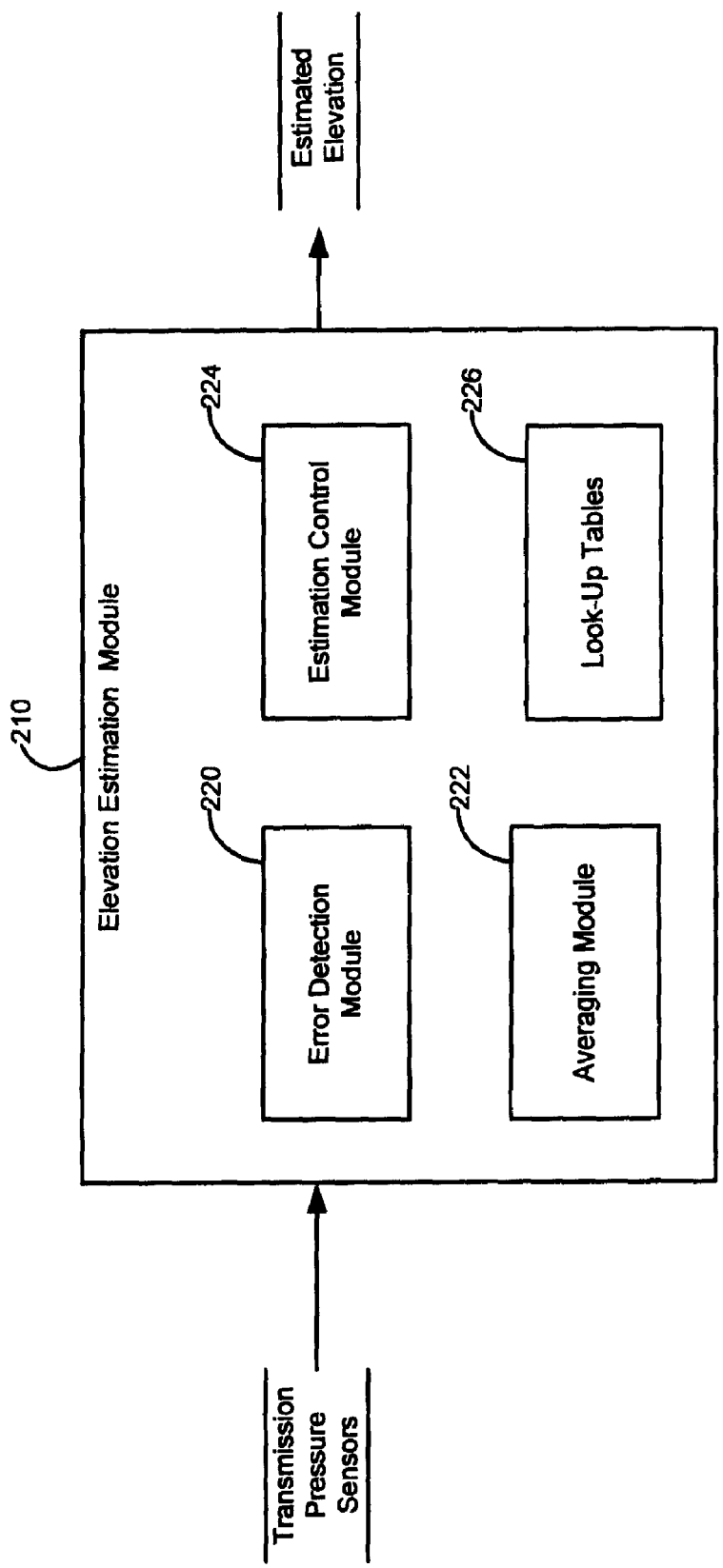
FIG. 4 is a functional block diagram of an elevation estimation module in accordance with an embodiment of the present disclosure.

Referring now also to FIG. 4, a functional block diagram of the elevation estimation module 210 is shown. The elevation estimation module 210 may include an error detection module 220, an averaging module 222, an estimation control module 224, and look-up tables 226. The error detection module 220 may detect when a one of multiple transmission pressure sensors is operating inappropriately. For example when one transmission pressure sensor provides a different atmospheric pressure than other transmission pressure sensors an error may be detected. This error may be indicated to a vehicle main control module, a vehicle operator, and/or may be stored in memory.

The averaging module 222 receives the hydraulic pressure signals from one or more of the pressure sensors of 214. The averaging module 222 may average the signals receives from the pressure sensors 214. The estimation control module 224 may estimate vehicle elevation based on the average of the signals from the pressure sensors 214 and based on the look-up tables 226.

The estimation control module 224 may generate elevation estimations corresponding to each pressure signal from each transmission pressure sensor. The look-up tables 226 may include predetermined values relating pressure sensor output signals to barometric pressure, elevation, altitude, etc. The averaging module 222 may generate an average elevation estimation signal based on an average of the elevation estimates from the estimation control module 224.

Figure 5:
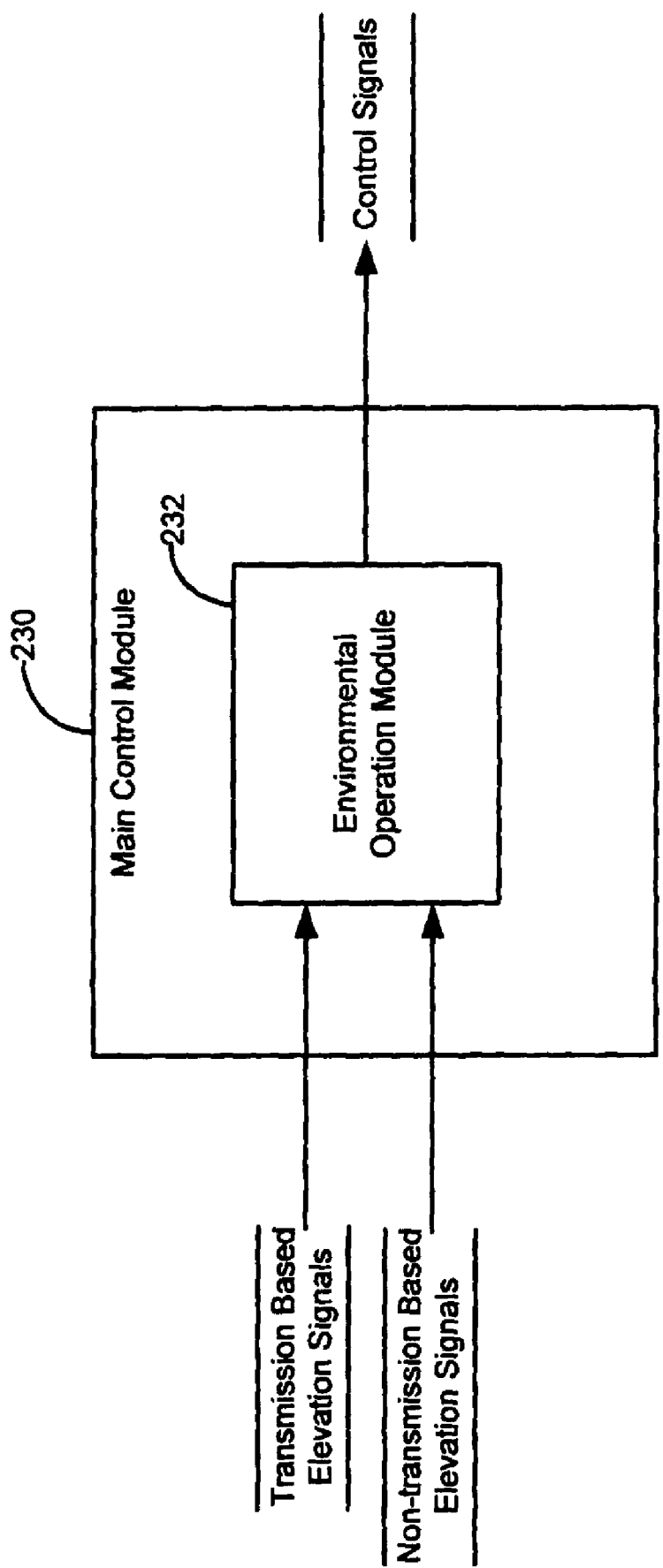
FIG. 5 is a functional block diagram of a main control module in accordance with an embodiment of the present disclosure.

Referring now also to FIG. 5, a functional block diagram of a main control module 230, such as the control modules 50 and 180 is shown. The main control module 230 includes an environmental operation module 232. The environmental operation module 232 may receive an estimated elevation signal, such as from the elevation estimation module 210. The environmental operation module 232 also receives non-transmission elevation signals from non-transmission elevation sensors, such as sensors 212. The environmental operation module 232 generates control signals based on one or more of the estimated elevation signal and the non-transmission elevation signals.

In one embodiment, the environmental operation module 232 may generate the control signals based an average of elevation estimates determined from transmission and non-transmission based elevation signals. Examples of transmission and non-transmission based elevation signals are the estimated elevation signals and the non-transmission elevation signals described herein. Selected elevation signals may be disregarded, such as when a sensor is providing an inaccurate signal.

To determine when an elevation sensor (transmission or non-transmission based) is operating inappropriately, elevation estimates generated based on transmission and/or non-transmission elevation sensors may be compared. The environmental operation module 232 may generate the control signals based on an average of elevation estimates that are from sensors that are operating appropriately. When all of the elevation estimates are determined to be inaccurate, the environmental operation module 232 may generate the control signals based on other vehicle parameters and sensor outputs.

The control signals may control operation of a fuel injection system, an air injection system, an ignition system, etc. The control signals may include fuel control signals, airflow control signals, ignition timing signals, etc. For example, the control signals may be throttle control signals that increase or decrease airflow into the engine based on the elevation. The control signals may also be fuel injector control signals that increase or decrease a fuel supply to the engine based on the elevation. The control signals modify the air-to-fuel ratio (A/F) of the engine based on elevation. For example, at a higher elevation, more air is required because the air pressure is lower.

Figure 6:
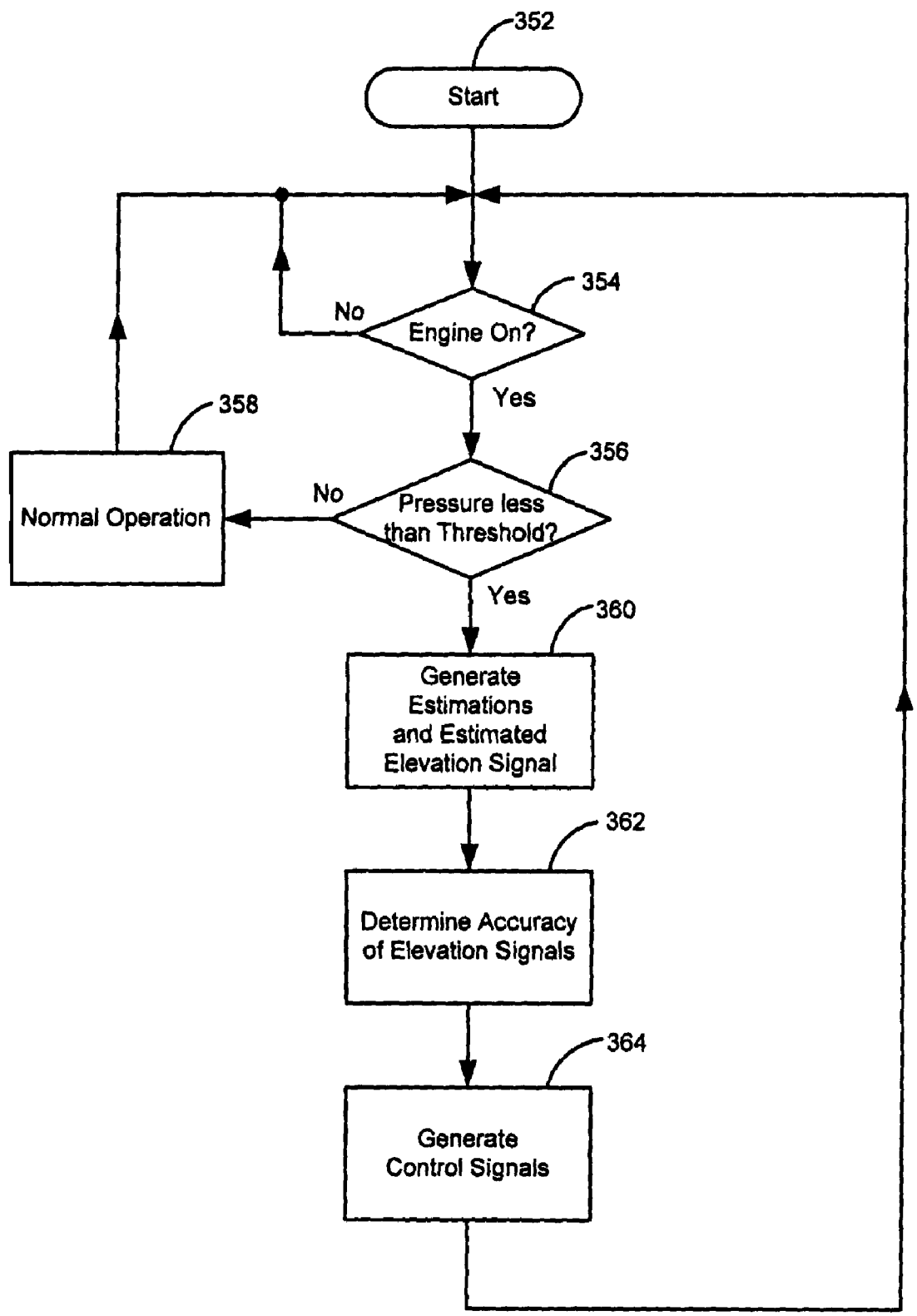
FIG. 6 is a logic flow diagram illustrating a control method of an engine control system in accordance with an embodiment of the present disclosure.

Referring now to FIG. 6, a flowchart illustrating the operation of a vehicle control system is shown. Control may begin at step 352. In step 354, the control system determines whether the engine has been started. If true, control proceeds to step 356, otherwise control returns to step 354.

In step 356, the control system determines whether the hydraulic pressure in the transmission is below a threshold. If true, control proceeds to step 360, otherwise control proceeds to step 358. In step 358, the control system generates control signals based on the elevation signals from the elevation sensors (normal mode), and control returns to step 354.

In step 360, the control system generates elevation estimations corresponding to each transmission pressure signal from transmission pressure sensors and may also generate elevation estimates based on each non-transmission elevation sensor. The elevation estimates may be based on look-up tables, such as the look-up tables. The vehicle control system then generates an average elevation estimation signal by averaging the elevation estimations. Control then proceeds to step 362.

In step 362, the control system performs at least one of two operations. The control system may cross-check each elevation estimate with other elevation estimates and/or with the average elevation estimation signal to determine if there was an error (i.e. a false reading) in any of the sensors. If the difference between an elevation estimate and other elevation estimates, or between an elevation estimate and an average elevation estimate exceeds a threshold value, an error is detected.

The control system may also average the elevation estimates to generate an elevation value for use in generating the control signals. The control system may also disregard elevation signals determined to be false readings, and average the remaining elevation estimates to generate the elevation value.

In step 364, the control system generates control signals, such as the control signals, based on the elevation value. The control signals may improve vehicle environmental operating characteristics. For example, at a high elevation more intake air is required because there is less air pressure. Therefore, the control signals may increase airflow by increasing throttle. Control then returns to step 354.

The above-described steps are meant to be illustrative examples; the steps may be performed sequentially, synchronously, simultaneously, continuously, during overlapping time periods or in a different order depending upon the application.

The embodiments of the present disclosure allow for the checking for an error or failure in sensors of various systems. These errors or failures may be due to debris on a sensor or due to wear and tear, age, or damage to a sensor or corresponding circuitry. Deviation from expected sensor readings and or expected elevation estimates may be used to indicate an error or failure. Outputs from transmission pressure sensors and/or elevation sensors may be average for improved accuracy, and used as a performance check for redundancy purposes. Outputs from transmission pressure sensors may be used as a sense check of a stand alone barometric sensor or altitude sensor.

The above-described embodiments include estimation of vehicle elevation using transmission pressure sensors. This elevation estimation may be determined with or without use of non-transmission elevation sensors, such as a barometric pressure sensor located external to a transmission. Pressure signals from the pressure sensors may be used to estimate elevation when non-transmission elevation sensors are providing an inaccurate elevation indication. The pressure signals may also be used to check accuracy of the non-transmission elevation sensors.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system of a vehicle comprising:
a first pressure sensor that detects hydraulic fluid pressure and that generates first pressure signal based on a first pressure in a transmission of the vehicle; and
a control module that determines atmospheric pressure based on said pressure signal and that controls operation of at least one of said transmission and an engine of the vehicle by generating a control signal based on said atmospheric pressure.

2. The control system of claim 1 further comprising a second pressure sensor that generates a second pressure signal based on a second pressure in said transmission,
wherein said control module determines said atmospheric pressure based on said first pressure signal and said second pressure signal.

3. The control system of claim 2 wherein said control module checks accuracy of said first pressure sensor based on said second pressure signal.

4. The control system of claim 1 further comprising a non-transmission elevation sensor that generates a sensor signal,
wherein said control module determines said atmospheric pressure based on said sensor signal.

5. The control system of claim 4 wherein said control module checks accuracy of said pressure sensor based on said sensor signal.

6. The control system of claim 4 wherein said control module checks accuracy of said non-transmission elevation sensor based on said pressure signal.

7. The control system of claim 1 wherein said pressure sensor operates in a first mode and in a second mode,
wherein said first mode includes detecting hydraulic fluid pressure applied on a clutch of said transmission, and
wherein said second mode includes detecting atmospheric pressure.

8. The control system of claim 1 wherein said pressure sensor is calibrated to generate a pressure of zero when hydraulic fluid pressure on a clutch of said transmission is zero and elevation of the vehicle is at sea level.

9. The control system of claim 1 wherein said control signal includes at least one of a fuel injection control signal, an air injection control signal, and an ignition control signal.

10. The control system of claim 1 wherein said control module determines said atmospheric pressure based on said pressure signal and a look-up table that includes pressures and corresponding elevations.

11. A vehicle control system of a vehicle comprising:
an elevation estimation module that receives pressure signals from a transmission via a pressure sensor that detects hydraulic fluid pressure and that generates an estimated elevation signal; and
a control module that generates a control signal based on the estimated elevation signal and a sensor signal received from a non-transmission elevation sensor.

12. The vehicle control system of claim 11 wherein the pressure signals are based on a hydraulic fluid pressure in said transmission.

13. The vehicle control system of claim 11 wherein said elevation estimation module generates the estimated elevation signal when the hydraulic fluid pressure is less than a predetermined threshold.

14. The vehicle control system of claim 11 wherein said elevation estimation module determines at least one of barometric pressure, altitude, and atmospheric pressure based on said pressure signals, and wherein said elevation estimation module generates said estimated elevation signal based on said at least one of barometric pressure, altitude, and atmospheric pressure.

15. The vehicle control system of claim 11 wherein said elevation estimation module generates said estimated elevation signal based on an average of said pressure signals.

16. The vehicle control system of claim 11 wherein said elevation estimation module generates said estimated elevation signal based on an average of elevation estimates that are generated from said pressure signals.

17. A method of operating a control system of a vehicle comprising:

generating a pressure signal based on a pressure in a transmission of the vehicle via a first pressure sensor that detects a hydraulic fluid pressure;

determining atmospheric pressure based on said pressure signal;

generating a sensor signal from a non-transmission elevation sensor;

determining elevation of the vehicle based on said atmospheric pressure and said sensor signal; and generating a control signal to adjust operation of at least one of said transmission and an engine of the vehicle based on said elevation.

18. The method of claim 17 further comprising:

detecting said hydraulic fluid pressure applied on a clutch of said transmission via said first pressure sensor of said transmission;

detecting atmospheric pressure via a second pressure sensor of said transmission; and controlling operation of said transmission based on said hydraulic fluid pressure and said atmospheric pressure.

19. The method of claim 17 further comprising detecting an error corresponding to an elevation sensor based on at least one of said pressure signal and said sensor signal.

20. The method of claim 17 further comprising adjusting operation of a pressure control solenoid of the transmission based on at least one of said pressure signal and said sensor signal.

* * * * *